United States Patent [19]
O'Brien et al.

[11] Patent Number: 6,071,446
[45] Date of Patent: Jun. 6, 2000

[54] METHOD FOR CENTERING WIRE HARNESS IN MOLD

[75] Inventors: Timothy F. O'Brien, White Lake; Joseph J. Davis, Jr., Ortonville; Jeffrey A. Branch, Eastpointe, all of Mich.

[73] Assignee: Lear Automotive Dearborn, Inc, Southfield, Mich.

[21] Appl. No.: 08/920,458

[22] Filed: Aug. 29, 1997

[51] Int. Cl.[7] .............................. B29C 39/10; B29C 44/06
[52] U.S. Cl. ...................... 264/46.5; 264/46.7; 264/46.9; 264/261; 264/272.11; 264/272.14; 264/275; 264/278
[58] Field of Search ................................ 249/91; 425/116; 264/278, 46.5, 46.7, 46.9, 261, 267, 272.11, 272.14, 275

[56] References Cited

U.S. PATENT DOCUMENTS

| | | |
|---|---|---|
| 3,142,716 | 7/1964 | Gardener . |
| 3,856,908 | 12/1974 | Harper ..................... 264/313 |
| 3,946,768 | 3/1976 | Fiorentino . |
| 3,985,951 | 10/1976 | Harris . |
| 4,270,961 | 6/1981 | Faranetta et al. . |
| 4,444,705 | 4/1984 | Kumasaka et al. . |
| 4,653,155 | 3/1987 | Hara . |
| 4,923,537 | 5/1990 | Matsushima . |
| 5,030,116 | 7/1991 | Sakai et al. . |
| 5,082,253 | 1/1992 | Suzuki et al. . |
| 5,100,311 | 3/1992 | Clemens et al. . |
| 5,168,124 | 12/1992 | Takase et al. . |
| 5,182,032 | 1/1993 | Dickie et al. .............................. 249/91 |
| 5,230,146 | 7/1993 | Tsuji et al. . |
| 5,338,014 | 8/1994 | Kitamura . |
| 5,490,664 | 2/1996 | Justus et al. . |
| 5,500,179 | 3/1996 | Onishi et al. . |
| 5,527,502 | 6/1996 | Kiuchi et al. . |
| 5,535,511 | 7/1996 | Karasik . |
| 5,598,627 | 2/1997 | Saka et al. . |
| 5,620,711 | 4/1997 | Saito ....................................... 425/116 |
| 5,645,779 | 7/1997 | Matsumoto ............................ 264/45.5 |

FOREIGN PATENT DOCUMENTS

| | | |
|---|---|---|
| 0235924 | 1/1987 | European Pat. Off. . |
| WO9200840 | 1/1992 | European Pat. Off. . |
| 0653278 | 5/1995 | European Pat. Off. . |
| WO9714022 | 4/1997 | European Pat. Off. . |
| 808785 | 7/1949 | Germany . |
| 63-313421 | 12/1988 | Japan . |
| 1178423 | 7/1989 | Japan . |
| 4324210 | 11/1992 | Japan . |

OTHER PUBLICATIONS

Database WPI, Section Ch, Week 9729 Jul. 1997, Derwent Publications Ltd., London, GB.

*Primary Examiner*—Allan R. Kuhns
*Attorney, Agent, or Firm*—MacMillan, Sobanski & Todd, LLC

[57] ABSTRACT

A mold for forming a wire harness includes a trough having a concave surface. A plurality of wire supports extend into the trough for supporting a plurality of wires in the trough and spacing the wires away from the concave surface. A polymer sheath material is introduced into the trough, thereby encasing the wires.

16 Claims, 3 Drawing Sheets

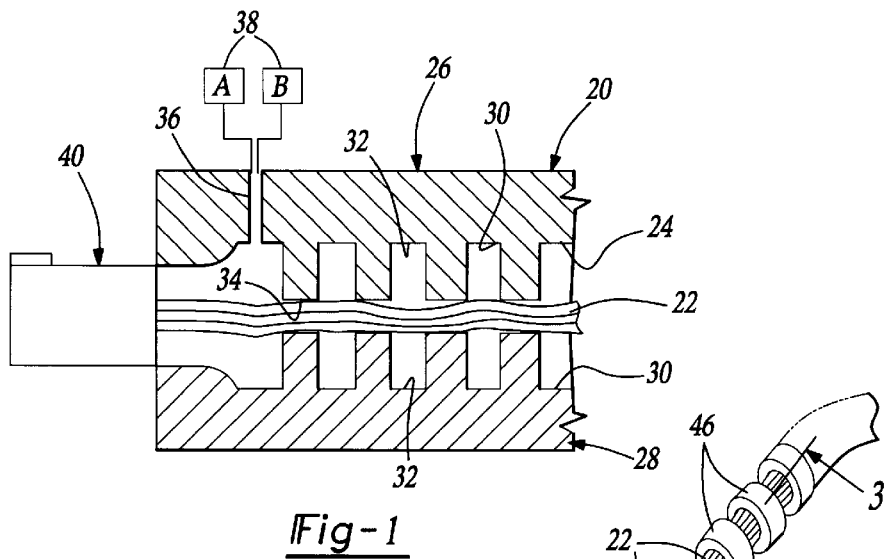
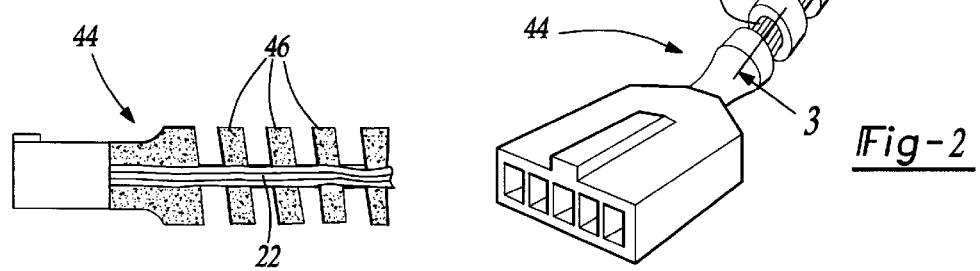
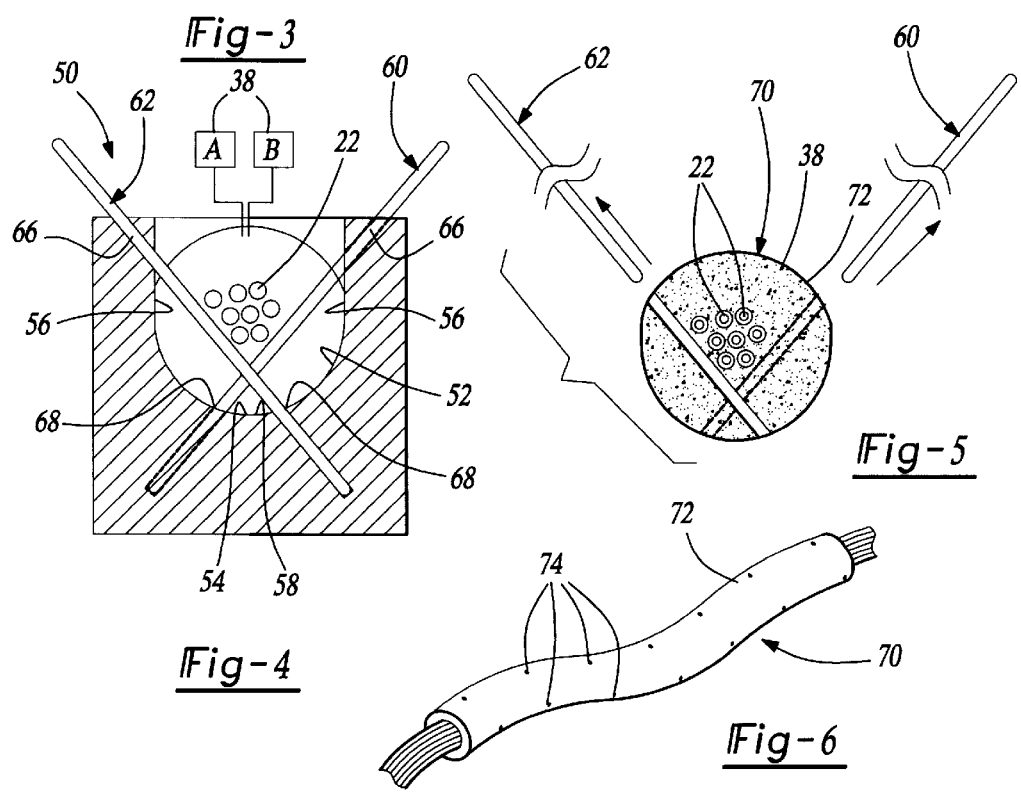

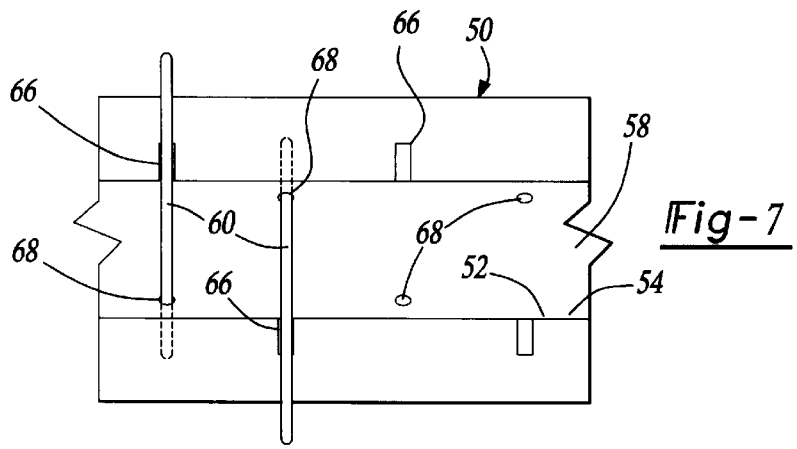
_Fig-7_
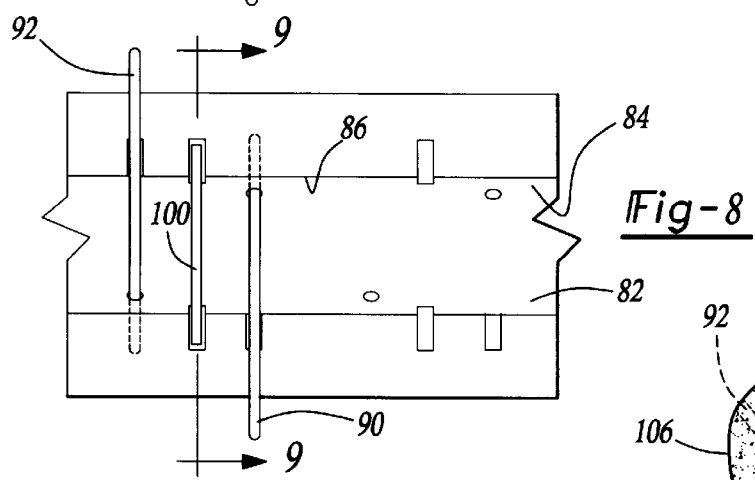
_Fig-8_
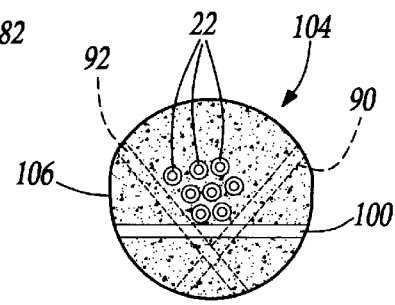
_Fig-10_
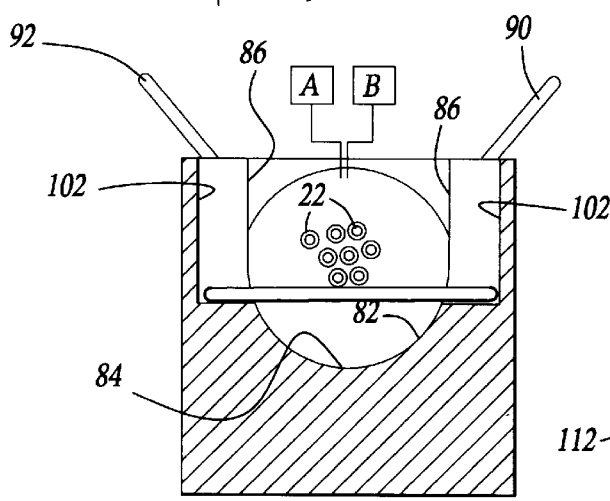
_Fig-9_
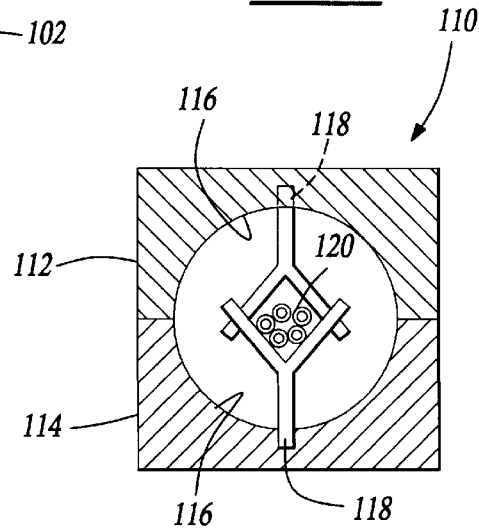
_Fig-11_

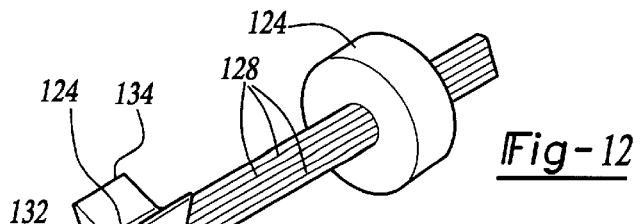
Fig-12
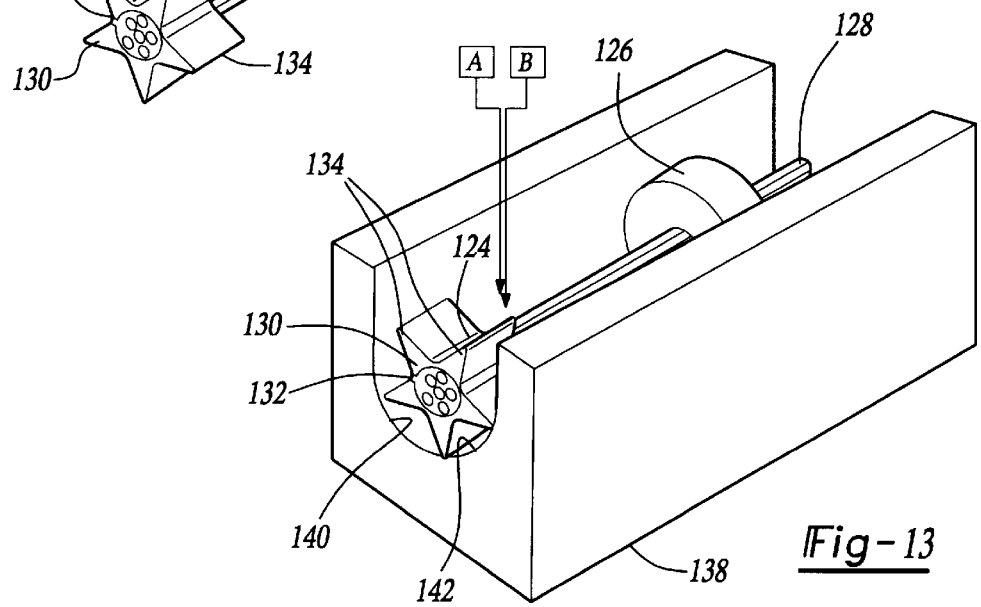
Fig-13
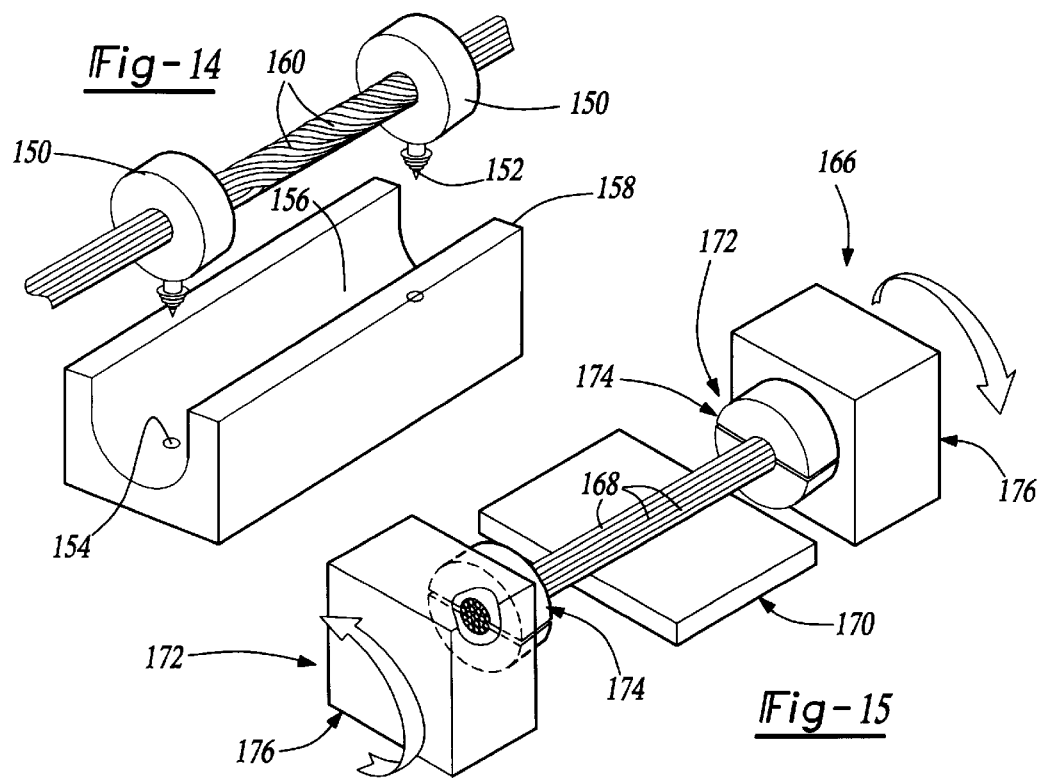
Fig-14
Fig-15

METHOD FOR CENTERING WIRE HARNESS IN MOLD

BACKGROUND OF THE INVENTION

The present invention relates to wire harnesses and more particularly to centering wires in a mold for making a wire harness.

Current vehicles include numerous wire harnesses interconnecting an increasing number of electrical components to user-activated and computer-controlled switches and sensors. Each wire harness comprises a plurality of wires which are bundled to form a main trunk and a plurality of branches extending from the trunk. Typically, each of the branches includes an electrical connector at an outer end.

During assembly of wire harnesses, the wire bundles are held together in an assembly jig, which includes a plurality of wire supports supporting the wires along each of the main trunk and each of the branches. Each wire is placed into the assembly jig onto the appropriate wire supports, i.e. from a first branch at one end of the wire harness, through the main trunk and through a second branch, typically at an opposite end of the wire harness. Electrical connectors are then connected to the outer ends of the wires at the branches. The wires are then wrapped with tape along the entire length of the main trunk and each of the branches.

Plastic tubes or sleeves are often secured around the bundled wires in selected locations to protect against mechanical wear caused by vibration. Foam sheets are often wrapped and taped about the bundles in selected areas to provide damping and reduce noise. Fasteners, such as christmas tree connectors, are secured to the bundled wires with the wrapped tape. Rubber gaskets are secured to selected portions of the bundled wires in order to provide water seals at selected locations. Branch identifiers, such as tape labels are often wrapped about the branches near the connectors in order to identify the branch so it is properly mounted and connected.

United Technologies Automotive has developed a new wire harness in which the wires are encased in a molded foam sheath. This is described in more detail in co-pending application U.S. Ser. No. 08/898,663, filed on Jul. 22, 1997 entitled "FOAMED-IN WIRE HARNESSES." Improvements are more fully disclosed in other co-pending applications: "WIRE HARNESS WITH INTEGRAL CONNECTOR" filed on Aug. 29, 1997 and assigned U.S. Ser. No. 08/920,768; "WIRE HARNESS WITH SPLICE LOCATORS" filed on Aug. 29, 1997 and assigned U.S. Ser. No. 08/920,589; "METHOD AND APPARATUS FOR SECURING WIRE HARNESS TO SURFACE" filed on Aug. 29, 1997 and assigned U.S. Ser. No. 08/920,978; "MULTISHOT MOLDS FOR MANUFACTURING WIRE HARNESS" filed on Aug. 29, 1997 and assigned U.S. Ser. No. 08/920,857; "FOAM WIRE HARNESS WITH SHAPE MEMORY" filed on Aug. 29, 1997 and assigned U.S. Ser. No. 08/920,570; "MOLD FOR ASSEMBLING AND FORMING WIRE HARNESS" filed on Aug. 29, 1997 and assigned U.S. Ser. No. 08/919,946. In order to protect the wires with the molded sheath, the wires must be spaced from the lower surface of the mold.

SUMMARY OF THE INVENTION

The present invention provides a mold for forming a wire harness. The mold includes a trough having a concave surface. A plurality of wire supports extend into the trough for supporting a plurality of wires and for spacing the wires away from the concave surface. Sheath material, preferably a polymer, and more preferably a foam, is introduced into the trough via a port. Because the wires are supported away from the surface of the trough, the sheath flows between the surface of the trough and the wires. When the polymer cures, the wires are encased inside the sheath, thereby protecting the wires.

In one embodiment, the wire supports comprise deep mold cuts upon which the wires are placed. In another embodiment, the wire supports comprise pins which are selectively retractable from the trough of the mold. In another embodiment, the wire supports comprise wire bundlers, which encircle and bundle the plurality of wires. The wire bundlers extend radially away from the plurality of wires in order to space the wires from the surface of the mold. The wire bundlers may also include a fastener, such as a christmas tree fastener for fastening to a panel.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1 is a sectional view of a mold for making a wire harness according to the present invention;

FIG. 2 is a perspective view, partially broken away, of a wire harness formed in the mold of FIG. 1;

FIG. 3 is a sectional view taken along line 3—3 of FIG. 2;

FIG. 4 is a sectional view through an alternate mold according to the present invention;

FIG. 5 is a sectional view of the wire harness formed in the mold of FIG. 4 in a subsequent step;

FIG. 6 is a perspective view, partially broken away, of the wire harness of FIG. 5;

FIG. 7 is a top view of the mold of FIG. 4;

FIG. 8 is another alternate mold according to the present invention;

FIG. 9 is a sectional view through the mold of FIG. 8, in a subsequent step;

FIG. 10 is a wire harness manufactured in the mold of FIG. 8 in a subsequent step;

FIG. 11 is another alternate mold according to the present invention;

FIG. 12 illustrates two devices for centering wires in a mold;

FIG. 13 illustrates the devices of FIG. 12 in a mold;

FIG. 14 is a perspective view, partially broken away, of alternate devices for centering wires in a mold;

FIG. 15 is a perspective view of an alternate apparatus for centering wires in a mold.

DETAILED DESCRIPTION OF THE PREFERRED EMBODIMENTS

The present invention provides a mold 20 for forming a wire harness having means for centering a plurality of wires 22 in a mold cavity 24. The mold 20 generally comprises an upper mold 26 and a lower mold 28 having complementary troughs 30 which form the cavity 24. Each trough 30 includes a concave surface 32, from which extend a plurality of wire supports 34. Preferably, the wire supports 34 comprise deep mold cuts, as shown, and most preferably are formed in a spiral pattern, so as to ensure that the cavity 24 remains continuous. At least one port 36 leads into the cavity 24 for introducing a polymer 38, preferably Elastoflex®, available from BASF. Other polymers 38 could also be utilized. The polymer 38 is preferably a two part foam, which is generally liquid when introduced into the cavity and cures or sets around wires 22. The wires 22 are preferably connected at each end to a connector 40. As will be recognized, the cavity 24 of the mold 20 would preferably include a main trunk, continuous with a plurality of branches (not shown). Further, the wires 22 would be routed along the main trunk and each of the branches in order to form a wire harness. Each of the branches would preferably terminate an electrical connector 40.

For assembly of a wire harness, the wires 22 are routed in the cavity 24 of the mold 20. The wires 22 are supported on wire supports 34, roughly in the center of the cavity 24 and away from the surfaces 32 of the upper and lower molds 26, 28. As used herein, the term "centering" means to space the wires 22 away from the surface of the molds 26, 28. The electrical connectors 40 (one shown) are connected to the wires 22. Preferably, an electrical check is performed on the wires and connectors 40 prior to molding. Then, the polymer is introduced into the cavity 24 of the mold 20. Because the wire supports 34 are formed in a continuous spiral, the cavity 24 is continuous, and the polymer 38 reaches the entire cavity 24. When the polymer 38 cures or sets, the formed wire harness is removed from the mold.

The wire harness 44 is shown in FIG. 2 having a molded, continuous polymer sheath 46 encasing wires 22. The sheath 46 generally comprises a continuous spiral which protects the wires 22.

As can be seen in FIG. 3, the sheath 46 is formed in a continuous spiral which protects the wires 22. Although the wires 22 are not covered by the sheath 46 where the wire supports 34 contacted the wires 22, the wires 22 are still protected by the sheath 46, due to the thickness of the sheath 46.

An alternate mold 50 is shown in FIG. 4 having a trough 52 having a concave surface 54 including a pair of opposed side walls 56 and a generally concave bottom wall 58. As can be seen in FIG. 4, a pair of pins 60, 62 extend through the mold 50 and cross just below the center of the trough 52. The wires 22 are supported away from the surface 54 by the pins 60, 62.

The pins 60, 62 are each inserted through an aperture 66 angling through the side wall 56, diagonally across the trough 52 and into an aperture 68 in the bottom wall 58. Preferably pairs of pins 60, 62 are located at axially spaced locations along the trough 52. The wires 22 are then routed along the trough 52 of the mold 50 and supported above the surface 54 of the mold 50 by the pins 60, 62. The polymer 38, again preferably Elastoflex® foam, is then introduced into the trough 52 of the mold 70. After the polymer 38 cures, the formed wire harness 70, shown in FIG. 5, along with the pins 60, 62 is removed from the mold 50. The cured polymer 38 forms a sheath 72 around and among the plurality of wires 22. The pins 60, 62 can then be removed from the sheath 72.

As can be seen in FIG. 6, the sheath 72 of the wire harness 70 will include a plurality of holes 74 formed by the removed pins 60, 62 (not shown). However, due to the flexibility of the sheath 72, these holes 74 would be sealed.

FIG. 7 is a top view of the mold 50. The apertures 66 and apertures 68 and formed in paired sets at axially-spaced locations along the trough 52 to provide for a pair of crossed pins 60, 62 at each location.

FIG. 8 illustrates an alternate mold 80 having a trough 82 having a concave surface 84 formed by opposed side walls 86 and a concave bottom wall 88. The mold 80 is similar to that of FIG. 4, in that it includes pins 90, 92 which are inserted through apertures 96, 98 and cross in the trough 82 above the surface 84. The mold 80 further includes a horizontal pin 100 which is placed in slots 102 in the side walls 86 adjacent the pins 90, 92. As can be seen in FIG. 9, the wires 22 are supported by the horizontal pin 100 and the crossing, diagonal pins 90, 92. As can be seen in FIG. 10, the pins 90, 92, 100 can be removed from the formed wire harness 104 by pulling them from the sheath 106 after the wire harness 104 is removed from the mold 80.

An alternate mold 110 is shown in FIG. 11 comprising an upper mold 112 and a lower mold 114 having complementary troughs 116. A plurality of wire supports 118 extend downwardly from the upper mold 112 and upwardly from the lower mold 114. The wire supports 118 are preferably Y-shaped forks. A plurality of wires 120 are routed along the wire supports 118 in a lower mold 114. When the upper mold 112 is closed onto the lower mold 114, the wire supports 118 in the upper mold 112 bundle the wires 120 together, generally in the center of the troughs 116. The wire supports 118 may be retracted into the upper and lower molds 112, 114 after the polymer is introduced into the mold 110, but before it completely cures. In this manner, it is ensured that the wires 120 will be encased by the polymer.

Alternate wire supports 124, 126 for supporting the wires 128 are shown in FIG. 12. The first wire support 124 comprises a star-shaped wire bundler 124. The star bundler 124 generally comprises an annular ring 130 having a radial split 132 to permit insertion of wires 128. The star bundler 124 further includes a plurality of circumferentially spaced radial projections 134. The second wire support 126 is a circular or annular wire bundler 126, generally comprising an annular ring having a circular outer circumference. The bundlers 124, 126 may be formed of a material which disintegrates in the presence of the polymer foam which will form the sheath about the wires 128. In this manner, the bundlers 124, 126 would hold the wires 128 generally in the center of a trough until the foam surrounds the wires 128.

As can be seen in FIG. 13, the wires 128 and bundlers 124, 126 are placed in a mold 138 having a trough 140 having a concave lower surface 142. The bundlers 124, 126 retain the wires 128 away from the surface 142. Foam 144 or other polymer is then introduced into the trough 140 of the mold 138, thereby encasing the wires 128. The radial projections 134 of the star bundler 124 permit the foam 144 to flow along the trough 140 passed the star bundler 124, between the radial projections 134.

Referring to FIG. 14, alternate wire bundlers 150 include integral fasteners 152, such as christmas tree fasteners, extending radially from the bundlers 150. The fasteners 152 may be inserted temporarily into stands 154, or apertures 154, formed in the trough 156 of the mold 158. In this manner, the wires 160 are held spaced away from the surface 162 of the mold 158. FIG. 15 illustrates an alternate apparatus 166 for centering wires 168 in a mold 170. The apparatus 166 includes a pair of wire twisters 172, which each comprise a clamp 174 for securing the wires 168 and the motor 176 for slightly turning the clamp 174 to twist the wires 168. In this manner, the wires 168 will be twisted together and forced toward the center of the mold 170 prior to introducing the polymer.

In accordance with the provisions of the patent statutes and jurisprudence, exemplary configurations described above are considered to represent the preferred embodiments of the invention. However, it should be noted that the invention can be practiced otherwise than as specifically illustrated and described without departing from its spirit or scope.

What is claimed is:

1. A method for assembling a wire harness including the steps of:

a) routing a plurality of wires in a trough of a mold;
   b) generally centering said plurality of wires in said trough, and securing a wire bundler to said plurality of wires, said bundler disposed between a concave surface of said trough and said plurality of wires, said bundler including a plurality of circumferentially spaced radial projections; and
   c) introducing a polymer in said trough around said plurality of wires, said polymer flowing adjacent said bundler between said radial projections.

2. The method of claim 1 wherein said step a) includes the step of placing said wires on a wire support in said trough.

3. The method of claim 2 further including the step of d) retracting said wire support.

4. The method of claim 3 wherein said step d) is performed after said step c).

5. The method of claim 1 wherein said step c) further includes the step of introducing said polymer into said trough in a generally liquid form, and said step b) is performed before said step c).

6. The method of claim 1 wherein said polymer is a foam.

7. The method of claim 1 further including the step of forming a sheath about said plurality wires with said polymer.

8. The method of claim 1 wherein said step b) includes the step of twisting said plurality of wires together.

9. The method of claim 1 further including the step of:
   supporting said plurality of wires on at least one mold cut extending radially inward from a concave surface of said trough.

10. The method of claim 9 further including the steps of:
    forming a plurality of said mold cuts extending radially inward from said concave surface of said trough;
    supporting said plurality of wires on said plurality of mold cuts;
    introducing said polymer around said mold cuts.

11. The method of claim 1 wherein the wire bundler has an annular portion.

12. The method of claim 1 wherein the annular portion includes a radial split to permit insertion of the wires.

13. The method of claim 1 where the wire bundler is formed from a material that disintegrates in the presence of the polymer.

14. The method of claim 1 wherein the wire bundler includes an integral fastener.

15. The method of claim 14 wherein the fastener is received in an aperture formed in the trough.

16. A method for assembling a wire harness including the steps of:
    routing a plurality of wires in a trough of a mold,
    generally centering said plurality of wires in said trough;
    supporting said plurality of wires on at least one mold cut extending radially inwardly from a concave surface of said trough;
    forming said mold cut in a continuous spiral; and
    introducing a polymer in said trough around said plurality of wires, wherein said polymer is introduced adjacent said spiral mold cut, said polymer flowing to said trough via a port adjacent said spiral mold cut.

* * * * *